US006345107B1

(12) United States Patent
Scott

(10) Patent No.: US 6,345,107 B1
(45) Date of Patent: *Feb. 5, 2002

(54) IMAGE PROCESSING APPARATUS AND METHOD OF PROCESSING HEIGHT DATA TO OBTAIN IMAGE DATA USING GRADIENT DATA CALCULATED FOR A PLURALITY OF DIFFERENT POINTS OF A SURFACE AND ADJUSTED IN ACCORDANCE WITH A SELECTED ANGLE OF ILLUMINATION

(75) Inventor: Paul James Scott, Leicester (GB)

(73) Assignee: Taylor Hobson Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,255

(22) Filed: Dec. 2, 1999

Related U.S. Application Data

(63) Continuation of application No. 08/802,392, filed on Feb. 18, 1997, now Pat. No. 6,031,928.

(30) Foreign Application Priority Data

Feb. 21, 1996 (GB) .............................. 9603653

(51) Int. Cl.[7] .............................. G06K 9/00
(52) U.S. Cl. .................. 382/108; 73/105; 345/581
(58) Field of Search ................ 382/106, 108, 382/154, 274, 285; 356/496, 500, 237.1, 239.7, 237.3–4, 371; 73/105; 345/429

(56) References Cited

U.S. PATENT DOCUMENTS

| 4,796,997 A | 1/1989 | Svekoff et al. ............. 356/376 |
| 4,877,326 A | 10/1989 | Chadwick et al. .......... 356/394 |
| 4,878,114 A | * 10/1989 | Huynh et al. ............... 382/108 |
| 4,901,064 A | 2/1990 | Deering ...................... 345/426 |

(List continued on next page.)

FOREIGN PATENT DOCUMENTS

| AU | 077026310 B | * 4/1979 | ................. 382/108 |
| GB | 2287790 | 9/1995 | |
| WO | WO 95/21410 | 8/1995 | |

OTHER PUBLICATIONS

Wright, D.A., "3D Surface Measurement by Co-ordinate Measuring Machine," Aircraft Engineering, vol. 62, No. 4, Apr. 1, 1990, pp. 13–17, 40, XP000243271.

McCartney, J. et al., "Leather Texture Synthesis and Rendering," Computers and Graphics, vol. 18, No. 1, Jan. 1994, pp. 87–92, XP000546570.

Wright, D.A., "3D Surface Measurement by Co-ordinate Measuring Machine," Aircraft Engineering, vol. 62, No. 4, Apr. 1, 1990, pp. 13–17, 40, XP000243271.*

McCartney, J. et al., "Leather Texture Synthesis and Rendering," Computers and Graphics, vol. 18, No. 1, Jan. 1994, pp. 87–92, XP000546570.*

"Explore: Integrated Software for 3D Image Synthesis, Technical Software Description Version 2.0," Oct. 1988, p. 14, re TEX3D, a 3D texture and material editor, Thomson Digital Image.

Primary Examiner—Jayanti K. Patel
(74) Attorney, Agent, or Firm—Lerner, David, Littenberg, Krumholz & Mentlik, LLP

(57) ABSTRACT

An apparatus and method for the processing of height information indicative of the roughness or texture of a surface which may be used to produce an improved two dimensional recording of the surface. The apparatus or method has particular applicability in the field on metrological instruments. In processing the surface information, the apparatus or method takes account not only of the basic height information but also of gradient information. Such gradient information is furthermore adjusted dependent upon a desired angle of illumination which may be selected by the user.

33 Claims, 8 Drawing Sheets

U.S. PATENT DOCUMENTS

| | | | |
|---|---|---|---|
| 4,906,940 A | * 3/1990 | Greene et al. | 382/100 |
| 4,971,445 A | * 11/1990 | Sato et al. | 356/376 |
| 4,973,164 A | * 11/1990 | Weber et al. | 356/600 |
| 4,989,973 A | * 2/1991 | Noso et al. | 356/239 |
| 5,003,615 A | 3/1991 | Seitz | 382/108 |
| 5,010,578 A | * 4/1991 | Siener et al. | 382/108 |
| 5,097,427 A | * 3/1992 | Lathrop et al. | 345/430 |
| 5,133,601 A | 7/1992 | Cohen et al. | 356/359 |
| 5,162,183 A | 11/1992 | Linblad et al. | 430/59 |
| 5,179,419 A | * 1/1993 | Palmquist et al. | 356/73.1 |
| 5,204,734 A | * 4/1993 | Cohen et al. | 382/108 |
| 5,243,666 A | * 9/1993 | Hasegawa et al. | 382/107 |
| 5,268,996 A | * 12/1993 | Steiner et al. | 345/426 |
| 5,325,301 A | * 6/1994 | Knoff et al. | 382/108 |
| 5,327,509 A | * 7/1994 | Rich | 382/108 |
| 5,361,100 A | 11/1994 | Teece | 348/578 |
| 5,430,445 A | * 7/1995 | Peregrim et al. | 342/25 |
| 5,455,870 A | * 10/1995 | Sepai et al. | 382/147 |
| 5,471,303 A | * 11/1995 | Ai et al. | 356/357 |
| 5,544,254 A | 8/1996 | Hartley et al. | 382/108 |
| 5,598,265 A | * 1/1997 | de Groot | 356/360 |
| 5,621,807 A | * 4/1997 | Eibert et al. | 382/103 |
| 5,621,824 A | * 4/1997 | Ijiri et al. | 382/274 |
| 5,680,484 A | * 10/1997 | Ohyama et al. | 382/108 |
| 5,714,756 A | * 2/1998 | Park et al. | 250/306 |
| 5,745,229 A | * 4/1998 | Jung et al. | 356/73 |
| 5,764,788 A | 6/1998 | Barnes et al. | 382/108 |
| 5,809,162 A | 9/1998 | Csipkes et al. | 382/108 |

* cited by examiner

| Key | - | Action |
|---|---|---|
| 1 | - | Light from the SW |
| 2 | - | Light from the S |
| 3 | - | Light from the SE |
| 4 | - | Light from the W |
| 5 | - | Height only |
| 6 | - | Light from the E |
| 7 | - | Light from the NW |
| 8 | - | Light from the N |
| 9 | - | Light from the NE |
| p | - | Toggle palettes |
| q | - | Quit and Save |

NORTH WEST

NORTH

NORTH EAST

WEST

HEIGHT ONLY

EAST

SOUTH WEST

SOUTH

SOUTH EAST

NORTH WEST NORTH NORTH EAST

WEST HEIGHT ONLY EAST

SOUTH WEST SOUTH SOUTH EAST

IMAGE PROCESSING APPARATUS AND METHOD OF PROCESSING HEIGHT DATA TO OBTAIN IMAGE DATA USING GRADIENT DATA CALCULATED FOR A PLURALITY OF DIFFERENT POINTS OF A SURFACE AND ADJUSTED IN ACCORDANCE WITH A SELECTED ANGLE OF ILLUMINATION

CROSS REFERENCE TO RELATED APPLICATIONS

This application is a continuation of U.S. Ser. No. 08/802,392 filed Feb. 18, 1997, now U.S. Pat. No. 6,031,928.

FIELD OF THE INVENTION

The present invention relates to an image processing method and apparatus which allows the recording of three dimensional topographical information onto a two dimensional medium, for example by processing the data such as to enable the subsequent display of such information on a visual display unit (VDU).

DESCRIPTION OF THE PRIOR ART

Conventionally three-dimensional topographical information may be processed to allow it to be recorded on a two-dimensional medium such as a visual display unit by the allocation of different colours to represent height information data values along an axis extending normally to the two-dimensional surface. The colours may comprise different shades of grey.

However, such a method takes no account of factors other than basic height information.

SUMMARY OF THE INVENTION

An image processing apparatus for providing image data for forming an image on an image carrier, which image is representative of a characteristic of a surface. The apparatus has input means for inputting a plurality of height values, each height value being representative of the height at a respective different point on the surface. Processing means is provided for calculating gradient data at a plurality of different points on the surface from the input height values. The gradient data is adjusted dependent upon a selected angle of illumination. Image data is generated by combining the corresponding values of the adjusted gradient data and the input height value for a plurality of different points. The processing means is arranged to combine the corresponding values of the adjusted gradient data and the input height value to generate the image data according to the relationship:

Image_Data $(x,y)=S*$Height $(x,y)+T*$Gradient $(x,y)$;

where Image_Data (x,y), Height (x,y) and Gradient (x,y) are the values of the image data, the input height and the adjusted gradient data at a point (x,y) on the surface respectively and S and T are weighting coefficients. An output means is provided for outputting said image data.

An embodiment of the present invention concerns the provision of an image processing method and apparatus which perform a low amount of data processing yet can produce data suitable for recording which account for both height, local gradient and angle of illumination information thereby providing an improved indicator of topology.

One application of the present invention is to provide apparatus suitable for processing the data produced by metrological instruments used to determine surface roughness or texture. Yet more particularly an embodiment of the invention is suitable for use for display processing in the metrological instrument described in United Kingdom published patent application GB-A-2287790, in the name of the applicant hereof. That instrument is of the type in which a stylus is driven across the surface to be measured so as to detect very small surface features to provide a measure of surface roughness or texture. Such apparatus is typically used for quality control, fault detection and the like.

Embodiments of the invention will now be described, by way of example only, with reference to the accompanying drawings in which.

Figure 1:
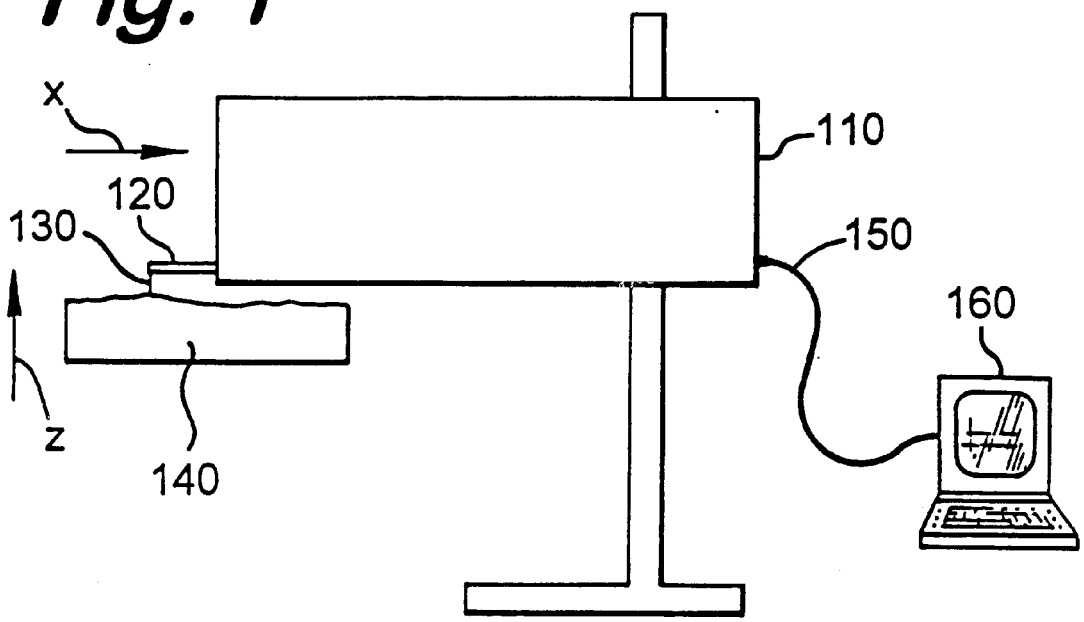
FIG. 1 is a schematic diagram showing data aquisition apparatus suitable for use in a method embodying the invention.

Referring now to the drawings, FIG. 1 shows very schematically and much simplified one example of data acquisition apparatus suitable for use in the data collection stage of a method embodying the invention.

The data collection apparatus is a metrological apparatus measuring surface roughness or texture of the type in which a stylus 130 provided mounted on pivot arm 120 is moved across a surface of a workpiece 140 to be measured, so that the stylus follows the texture or roughness of the surface. Deflection of the stylus as it moves across the surface is measured at predetermined intervals by conventional means such as an optical interferometer system or a LVDT (linear variable differential transducer) associated with the stylus or the pivot arm. The data is logged at predetermined intervals by use of a suitable data logger or an appropriately programmed personal computer, such as the personal computer 160 connected via link 150 to the unit 110.

The data acquisition apparatus may be any of the range of Talyscan metrological instruments produced by the applicant and commercially available at the date of filing hereof. Although not shown in FIG. 1, desirably the data acquisition apparatus used is of the type disclosed in GB-A-2287790 which enables the rapid determination of the surface texture of a two dimensional area of a workpiece surface. Of course, other forms of surface texture or roughness data acquisition apparatus may be used such as a scanning tunnelling microscope, an atomic force microscope or an optical system.

In operation of the apparatus shown in FIG. 1, if the desired surface to be measured is defined as an x-y plane with the x axis in the direction shown by the arrow in the diagram and the y axis defined as into and out of the paper, the stylus 130 is moved across the x-y surface of the workpiece 140 in an x direction at a constant y co-ordinate and the height Z ($X_i$, $Y_0$) of the surface is measured at each of a plurality of predetermined data points ($X_i$,$Y_0$) (i=0,1,2, . . . n). Once the surface scan of the desired area is complete in the X direction, the height at n points having been measured, the unit 110 is displaced in the Y direction and the X scan is repeated to determine the height Z($X_i$,$Y_1$) (i=0,1,2 . . . n). This process is repeated for all values of Y such that a set of height values Z($X_i$, $Y_j$) (i=0,1,2 . . . n; j=0,1,2 . . . m) has been collected.

Figure 2:
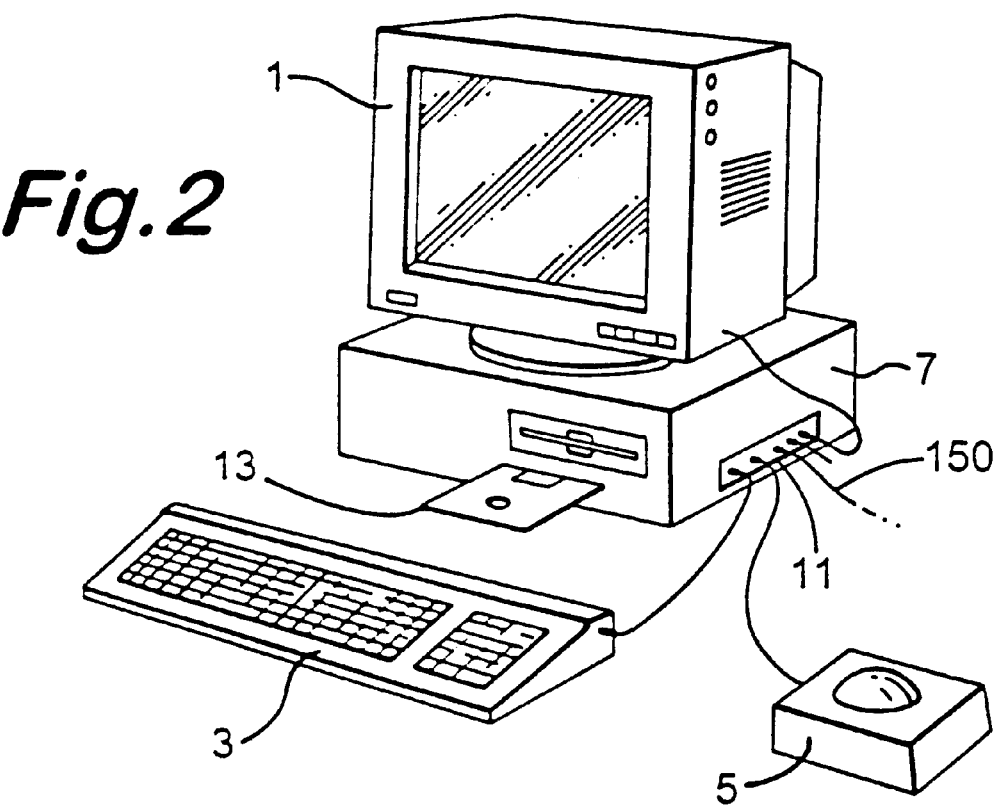
FIG. 2 is a diagram showing in more detail the image processing apparatus shown in FIG. 1.

FIG. 2 shows a personal computer 160 with a processing unit 7 to which is connected a visual display unit 1 which is used both to facilitate command entry and to display the processed information. Commands may be entered into the processing unit 7 via keyboard 3 or pointing device 5 used either separately or in conjunction. Data from the metrological measuring unit 110 is passed to the personal computer by input line 150 via interface 11, the personal computer acting as the data logger hereinbefore described (step 1, FIG. 4).

Alternatively data may be provided on a magnetic data carrier 13 or other portable data storage medium.

The desired surface texture or roughness data is stored by the data storage medium or in the internal memory of the processing unit as a two dimensional array of height data Z ($X_i$,$Y_j$) such data being suitable for subsequent processing as described below to produce a two dimensional recording. Each data point Z(X,Y) will correspond, in this example, to a pixel in the final image.

Figure 3:
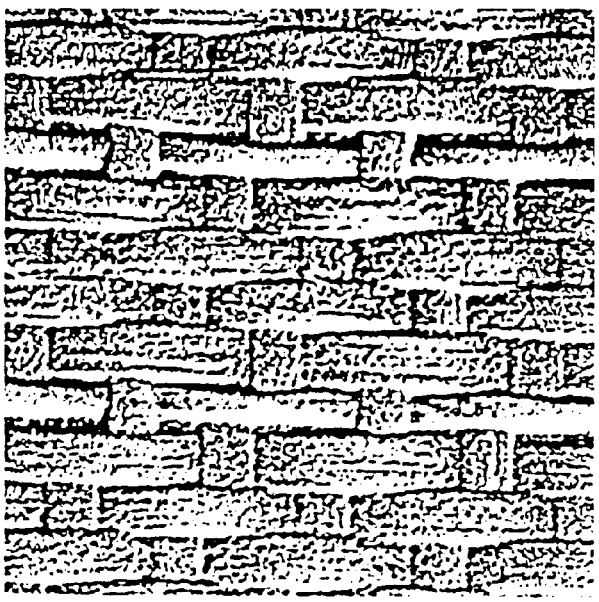
FIG. 3 is a diagram showing a typical user interface of the image processing apparatus.

In the present embodiment, before commencing processing of the stored data, the computer 160 displays a simple menu on the visual display unit 1, as shown in FIG. 3. The menu allows a user to select a desired angle of illumination for the two-dimensional image by simply selecting a numeral in the range 1–4 or 6–9. In this example, the numerals 1–4 show illumination from the southwest, south southeast and west respectively while the numbers 6–9 select illumination from the east, north west, north and north east respectively. In FIG. 3 north is to the top of the paper. As will be explained below the user may also select a height only representation by depressing the numeral 5 key. Furthermore the user may toggle between a grey scale representation and a false colour representation by depressing the letter P on the keyboard.

Figure 4:
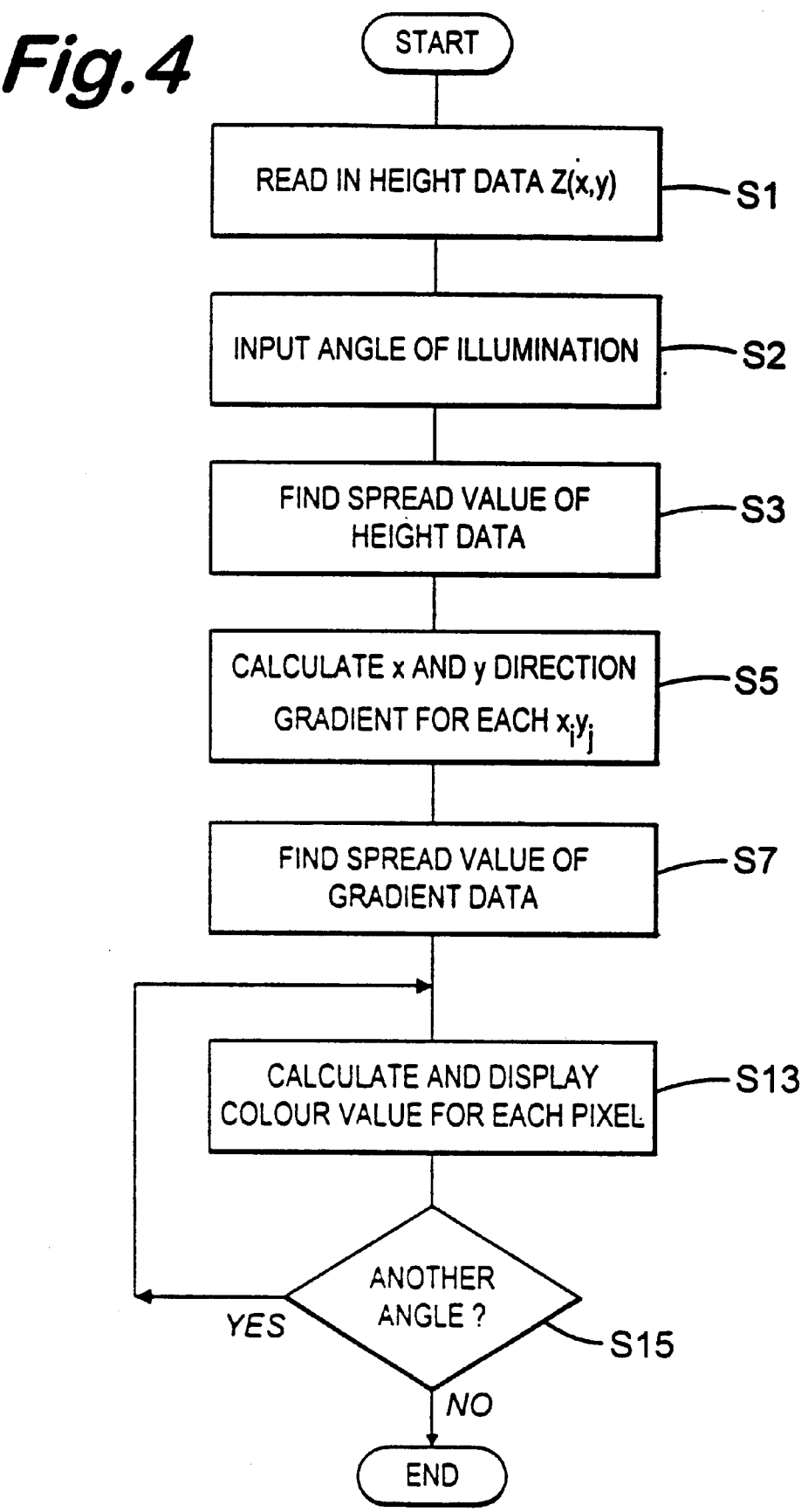
FIG. 4 is a flow diagram illustrating a method of embodying the invention.

Referring now to FIG. 4, once the user has selected the desired option by depressing any one of keys 1 to 9 (step 2) height data Z ($X_i$,$Y_j$) from a memory of the computer 160 is used to determine a value indicative of the spread of the height data (step 3). In step 5, the gradient in both the X and Y directions at each value $X_i$,$Y_j$ is calculated and stored in an appropriate array. A single measure of the spread of the gradient values in both x and y directions is thereafter calculated (step 7) and the colour or grey scale for each pixel is determined in accordance with a weighted combination of the height and gradient value at the point, the gradient value having been adjusted to account for the angle of illumination. The user thereafter has the options of selecting another angle of illumination (step 15) in which case the processing step 13 is repeated.

Figure 5:
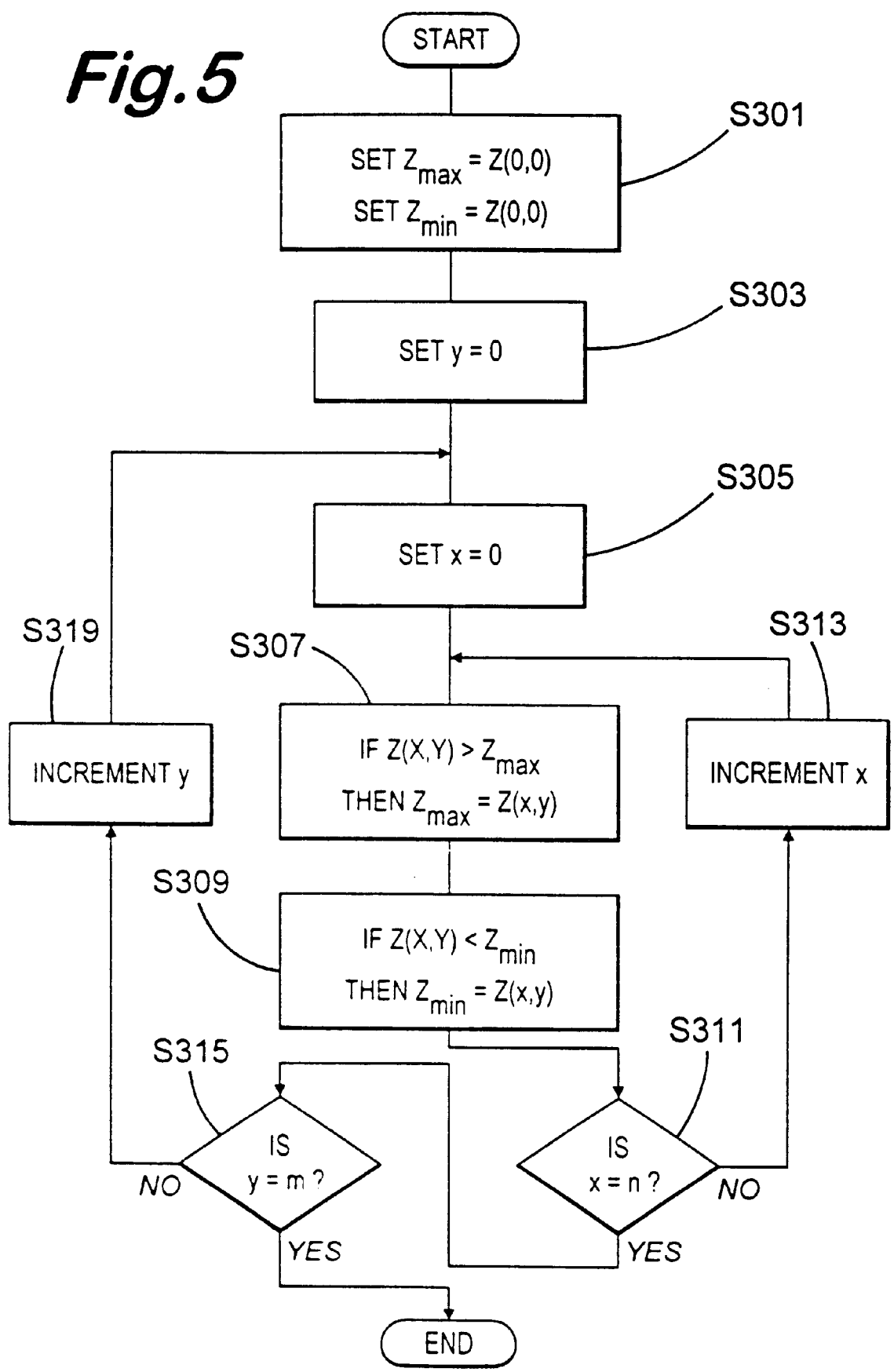
FIG. 5 is a flow diagram illustrating one way of calculating the maximum and minimum height in the method illustrated by FIG. 4.

FIG. 5 shows in detail one example of a method of determining the spread of the height values Z ($X_i$,$Y_j$), the measure of spread used being the range. In the example, the range is calculated by finding the maximum $Z_{max}$ and minimum $Z_{min}$ height values by comparing each value of Z ($X_i$,$Y_j$) with previously stored values of $Z_{max}$ and $Z_{min}$ and replacing the previously stored values with the current value of Z ($X_i$, $Y_j$) when the current height value is greater than $Z_{max}$ or less than $Z_{min}$ respectively.

In step 301 the values of $Z_{min}$ and $Z_{max}$ are initialised by copying the height value Z(0,0) that is to say the height value at point X=0, Y=0. As those skilled in the art will realise the height value at any other point or a fixed reference value, for example zero could be used to initialise the variables.

Remaining steps 303 to 317 comprise two nested loops. This allows for the height Z at each pixel $X_i$,$Y_j$ to be considered and the values of $Z_{max}$ and $Z_{min}$ updated if appropriate.

The variables Y and X are set to 0 (steps 303 and 305) and the height Z(0,0) (i.e. the height value at X=0, Y=0) is compared to the present stored value of $Z_{max}$. If it exceeds $Z_{max}$ then Z(0,0) becomes $Z_{max}$ (step 307). In a similar manner in step 309 the value of Z(0,0) is compared to $Z_{min}$ and if it is less than that value then $Z_{min}$ is made equal to Z(0,0). The system next determines, in step 311 whether X is equal to n being the total number of X points. If not, then X is incremented in step 313 and the procedure returns to step 307 and repeats steps 307 to 311. For example, after the comparison of value Z(0,0), the height value Z(1,0) is compared with the stored values of $Z_{max}$ and $Z_{min}$. This repetition continues until x=n that is until all X values have been considered for the value Y=0.

If all values of Y have not yet been considered then Y is then incremented at step 319, X is reset to zero (step 305) and steps 307 and 309 repeated for all values of X at this new value of Y. This procedure is repeated until Y=m is true indicating that at step 315 all values of X and Y have been considered. At this stage the stored values of $Z_{max}$ and $Z_{min}$ will represent the actual maximum and minimum height data values.

The range is simply the difference between the maximum and minimum height values, namely $Z_{max}$ minus $Z_{min}$. Such an approach is satisfactory because the data relating to surface roughness or texture is unlikely to include any extreme values. Of course if the presence of such extreme values were to be likely, a different measure of range (such as inter-quartile range) or a different measure of spread could be used.

One method of determining the values of the gradient at each point in both the X direction ("gradientX") and the Y direction ("gradientY") will now be described. The gradient calculated at each point is the "3 point gradient" that is to say it is calculated by considering the height of the points at either side (in the direction of interest) of the point of interest. It will be appreciated that this calculation of gradient effectively takes no account of the height of the instant point and that the distance between the points on either side is effectively two units. Thus the gradient is effectively the difference in the heights of the points on either side divided by two. As the surface of interest is two dimensional, the gradient in the X direction and the Y direction are calculated separately.

It will the appreciated that the above mentioned method of calculation cannot be used to calculate the gradient of points on the outer boundaries of the surface, for example the points (0,0) and (n,m). Various methods could be use to calculate the gradients at such points but the method used in the present embodiment is to calculate the gradient value by taking the height difference in the relevant direction between the boundary point itself and this the adjacent point. This result is not divided by two, as is the case for non-boundary points, as the distance between the points used is unity.

Thus for them example point (0, 0) the difference in height between it and (1, 0) is used to calculate gradient X and the difference between it and (0, 1) is used to calculate gradient Y. For the point (n, m), the corresponding points are (n−1, m) and (n, m−1).

The process of calculating the gradients at all points other than boundary points will now be described with reference to FIG. 6. In steps 501, 503 and 505 the variables SD, Y and X are setto 0. The variables Y and X are used to control looping and the variable SD in the calculation of gradient spread. At step 507, the gradient at the point Z(x,y) in the X direction is calculated by determining the difference in the heights at points (x+1, y) and (x−1, y) and dividing by two, ie:

$$GradientX = \frac{Z(x+1, y) - Z(x-1, y)}{2}$$

At step 509 the gradient of the point (x,y) in the Y direction is calculated in a similar manner, ie:

$$GradientY = \frac{Z(x, y+1) - Z(x, y-1)}{2}$$

Of course, if the point (x,y) lies on a boundary, that is to say if x=o, x=n, y=o, or y=n then the modified calculation of gradient previously described is used.

In step 511 the variable SD is increased by the sum of the square of the gradient in the X direction and the square of the gradient in the Y direction, that is to say:

$$SD=SD+(GradientX)^2+(GradientY)^2$$

At step 513 it is considered whether all X values have been processed for the current value of Y (ie. whether x=n). If this is not the case then X is incremented at step 515 and steps 507 to 511 repeated until all such X points at the current Y value have been processed. In step 517 it is considered whether all values of Y have been processed (ie. whether y=m). If they have not been then the value of y is incremented, x is reset to zero and all values of X are reprocessed for the new value of y. It is noted that this nested loop structure is similar to that used in the determination of the maximum and minimum height values. The processing of steps 505 to 511 continues until gradients at all values of X and Y have been determined.

At step 521 the standard deviation is calculated using the simplified relationship:

$$\sigma \approx \sqrt{\frac{SD}{n*m}}$$

The reasoning behind the validity of the above simplification will now be explained. As will be known to those skilled in the art, the standard deviation of a set of p values of V is defined as:

$$\sigma = \sqrt{\frac{1}{p}\sum_{q=1}^{n}(V(q))^2 - \mu^2}$$

The gradients of the majority of surfaces of interest, ie. surfaces for metrological analysis, will generally have a mean $\mu$ of zero and thus the term $\mu^2$ can effectively be eliminated from the above equation, only an approximation to the standard deviation $\sigma$ being required for the purpose of the present example.

It will be appreciated that values of spread have been calculated by different methods for the height and gradient values. Any suitable measure of spread could be used but it has been found that using the measures described above gives good results whilst not requiring excessive processing. It will furthermore be appreciated that a more sophisticated gradient calculation could also be performed.

The calculation of individual colour values for each point will now be described.

To allow each pixel value to be calculated a normalised height and a normalised gradient at each point is calculated. In the present example the height is normalised by use of the range of height values and the gradient is normalised by division by six times the standard deviation, it being known that in a normal distribution of height values in excess of 99%, generally 99.73%, of such values lie within plus or minus three times the standard deviation.

In addition to normalisation, the gradient value at each point is adjusted so as to take account of the angle of view that was input in step 1 (FIG. 4). The apparent gradient, taking into account the angle of illumination will be a weighted combination of the gradient in the X and Y direction, the weighting being determined by the angle of illumination.

Finally before the output of the data for display, each value is checked to see that it lies within the permissable range. If an output value does not lie within this range it is set to the appropriate end value.

Figure 6:
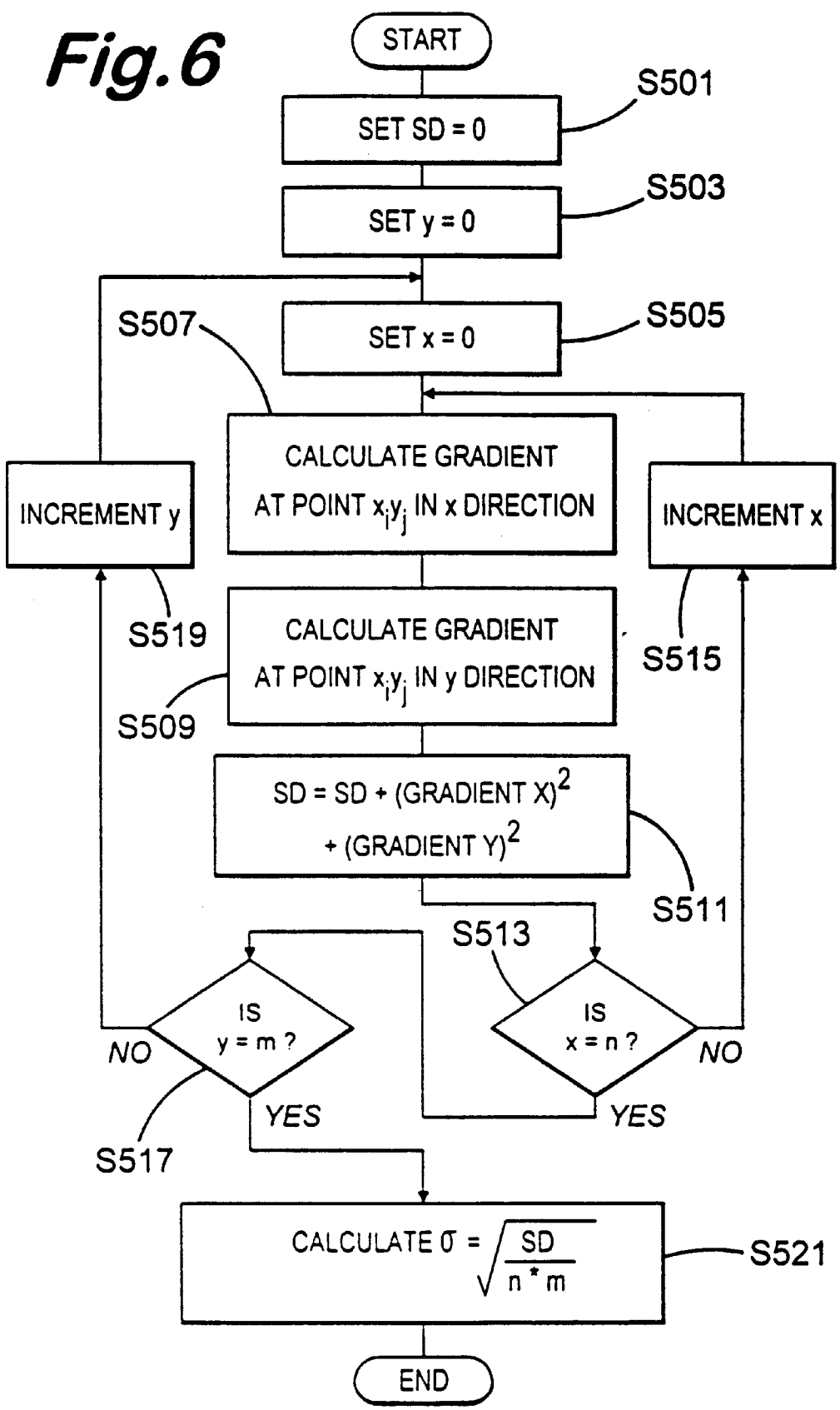
FIG. 6 is a flow diagram illustrating one way of calculating the gradients and a gradient spread coefficient in the method illustrated by FIG. 4.

Referring now to FIG. 7, again the scheme of nested loops, previously described in relation to FIGS. 5 and 6 is used to ensure that each value of X is considered for a given Y, the value of Y is thereafter increased and each value of X reconsidered such that each value of X and Y is sequentially considered.

Y and X are initialised to 0 in steps 1301 and 1303 respectively.

In step 1305 the height is normalised by the subtraction of the minimum height $Z_{min}$ and the division of this result by the range ($Z_{max}-Z_{min}$). In this manner it will be apparent that the normalised height $Z_{norm}$ (X,Y) will be a number between zero and one. The normalised height is thereafter multiplied by the number of colours minus one, in this embodiment 255 (step 1307), to give a value of between zero and 255.

In steps 1309 to 1313 the gradient value is processed so as to result in a value in the same range as that of the height value, i.e. from zero to 255.

In step 1309 the gradient value is adjusted to take account of the angle of illumination $\theta$ according to the following formula:

$$Gradient(x,y)=Sin(\theta)*GradienX(x,y)+Cos(\theta)*GradientY(x,y)$$

After such adjustment the gradient value is "normalised" in step 1311 by dividing it by six times the standard deviation $\sigma$, the value 6 being used for the reasons previously stated. In the majority of cases the "normalised" gradient value will thus lie between −1 and 1. It will be noted that an occasional value of "normalised" gradient may lie outside these limits and such exceptional values are corrected later in the process in step 1317.

In step 1313 the value of "normalised" gradients is processed in order to provide a value of between 0 and 256. This is achieved by multiplying the "normalised" gradient value by 128 and adding a constant of 128.

There will now be a value of height and a value of gradient for the point currently being processed. Generally these values will lie in the range 0 to 255. A weighted average of the height and gradient at the point is taken in order to determine the colour that the pixel representing that point is to be set to. In this example equal weighting is used, that is to say in effect a simple average of the two values is taken.

More generally:

colour of pixel(x,y)$S$*Height(x,y)+$T$*Gradient(x,y)

In the example, ST=0.5 but different values of S and T could be used appropriate maintaining the relationship S+T=1.

As mentioned before it may be the case that due to the way in which the gradient value is "normalised" a value outside the permissable range of colours may be produced. This is corrected in step 1317. Thus if the colour valued is less than zero, it is set to zero and if greater than 255 it is set to 255. In step 1319 a pixel is stored and may also be output at position X,Y in the calculated colour, colour (X,Y). In the described example the pixel is output for display on a visual display unit although alternatively such pixel could be printed to produce a hard copy. The processed image could also be stored on a data carrier or output to a transmission link.

In step 1321 it is considered whether the current value of X is equal to n. If note the value of X is incremented and the processing recommences at step 1305. In this manner all values of X are processed at the value of Y. When all such processing has occurred at step 1325 it is considered whether Y is equal to the total number of values of Y, that is to say m. If all values have not been considered then the value of Y is incremented and the processing returns to step 1303 that is to say it resets X to 0. Thereafter all values of X at the new value of Y are processed.

Figure 7:
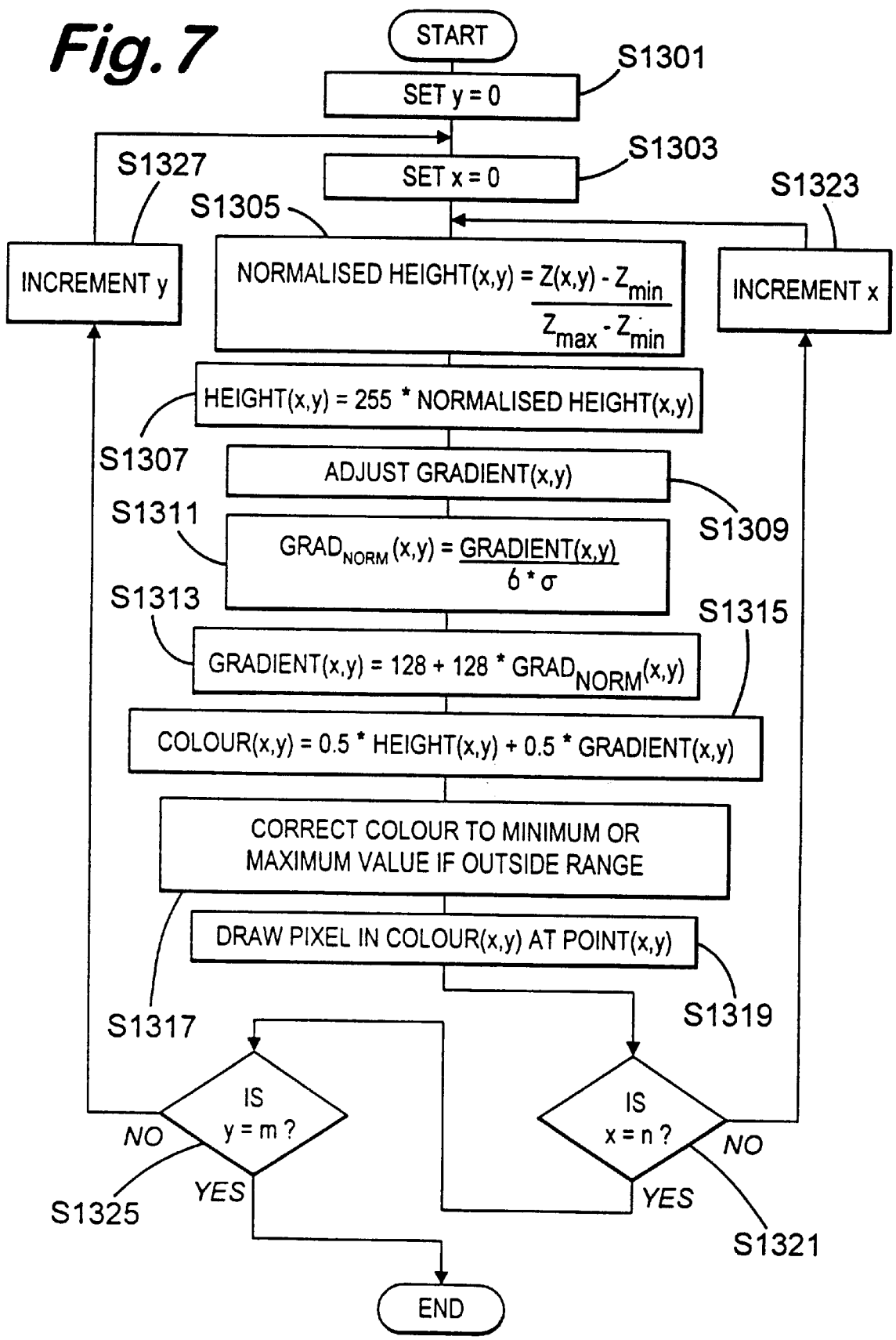
FIG. 7 is a flow diagram illustrating one way in which the colour of subsequently displayed pixels can be calculated in the method illustrated in FIG. 4.

Once all such processing has occurred an image representative of the scanned surface will, in the example, be displayed on the visual display unit 1. At step 15 (FIG. 4) the user is prompted and may request alteration of the angle of illumination θ by choosing an appropriate menu option. If an alternate angle is selected step 13 of FIG. 4, that is to say the processing steps 1301 to 1325 of FIG. 7 are repeated.

Figure 8:
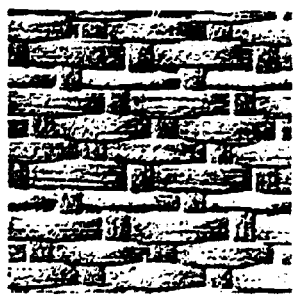
FIGS. 8 and 9 show examples of images produced from image data processed in accordance with a method embodying the invention.
Figure 8:
Figure 8:
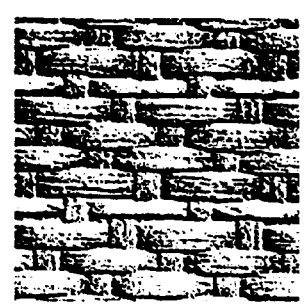
Figure 8:
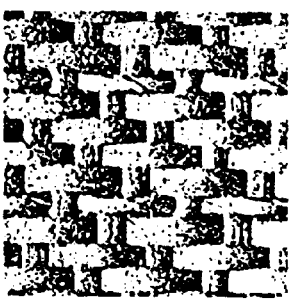
Figure 8:
Figure 8:
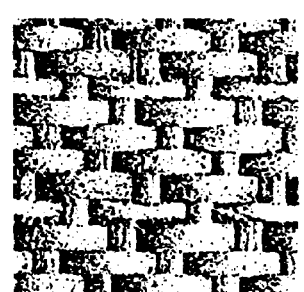
Figure 8:
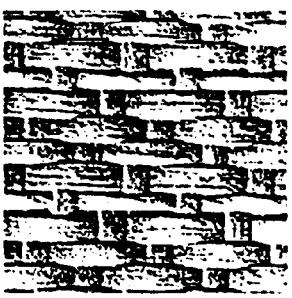
Figure 8:
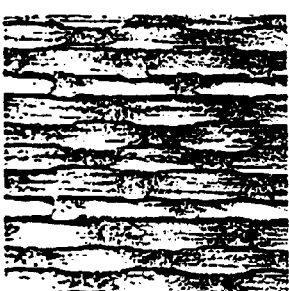
Figure 8:
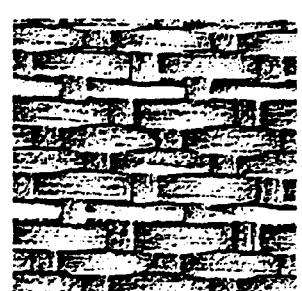
Figure 9:
Figure 9:
Figure 9:
Figure 9:
Figure 9:
Figure 9:
Figure 9:
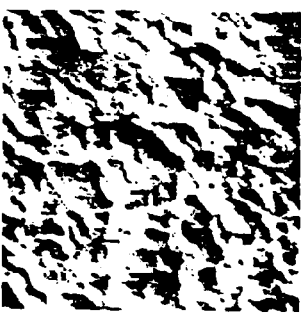
Figure 9:
Figure 9:

FIGS. 8 and 9 show typical output produced by the above described embodiment, for a number of different examples of illumination. The data processed was produced by the scanning of the surface of a woven mat (FIG. 8) and a grinding wheel (FIG. 9) with metrological apparatus as previously described.

In each case the central picture shows height data only. The surrounding pictures show the combination of height data and adjusted gradient data in accordance with the previously described example. As will be seen from an examination of the pictures the representations produced by the previously described method are superior to the height only representations. Furthermore it will be seen from an examination of FIG. 8 in particular that by varying the angle of illumination different features may be highlighted. This facilitates inspection of the scanned surface and location of defects.

In the above described example, the image to be displayed was of n*m pixels and one data point was displayed by one pixel. However more than one pixel might be used to display a point if the amount of data is lower than the available image area. Conversely, if the amount of data exceeds the available image area, the data might be thinned (i.e. data discarded) or averaged to make the number of data points equal to the number of pixels available for display, accounting for the desired size of the image.

Yet further, although the described example consists of a series of commands suitable for software implementation at computer, such implementation is not essential and instead the invention could be embodied in articles of hardware.

What is claimed is:

1. Metrological apparatus for determining the surface texture or roughness of a workpiece comprising:

means for measuring the height of the surface at a plurality of different points on the surface to produce a corresponding plurality of height values;

selection means for selecting one of a plurality of angles of illumination;

processing means for:

(i) calculating local gradient data at each of a plurality of said different points on the surface from said height values, (ii) adjusting said gradient data dependent upon a selected angle of illumination, and (iii) generating image data by combining the corresponding values of said adjusted gradient data and said input height value for a plurality of said different points; and means for forming an image in accordance with said image data.

2. Imaging processing apparatus for providing image data for forming an image on an image carrier, said image being representative of a characteristic of a surface, the apparatus comprising:

input means for inputting a plurality of height values, each height value being representative of the height at a respective different point on the surface;

selection means for selecting one of a plurality of angles of illumination;

processing means for:

(i) calculating local gradient data at each of a plurality of said different points on the surface from said input height values, (ii) adjusting said gradient data dependent upon a selected angle of illumination, and (iii) generating image data by combining the corresponding values of said adjusted gradient data and said input height value for a plurality of said different points; and output means for outputting said image data.

3. Apparatus according to claim 2 further comprising image forming means for forming an image in accordance with the output image data.

4. An apparatus according to claims 3 or 1 wherein said image forming means is adapted to form an image of the point (x,y) in a colour in accordance with a weighted mean of the height value at the point (x,y) and the adjusted gradient value at the point (x,y).

5. An apparatus according to claims 3 or 1 wherein said image forming means comprise a visual display unit.

6. An apparatus according to claims 2 or 1 wherein said image forming means comprises a printer.

7. An apparatus according to either claims 2 or 1, wherein said image forming means is adapted to form the image such that the color of a point of the surface is determined by the corresponding value of said image data.

8. An apparatus according to claim 2 or 1 further comprising user input means for inputting the selected angle of illumination.

9. An apparatus according to claim 2 or 1, wherein said processing means includes means for normalising the height data.

10. An apparatus according to claim 9, wherein said height data normalising means includes means for calculating the range of the height data.

11. An apparatus according to claim 3 or 1, wherein said processing means includes means for normalising the gradient data.

12. An apparatus according to claim 11 wherein said gradient data normalising means includes means for calculating the standard deviation of the gradient data.

13. An apparatus according to either claims 2 or 1, wherein said processing means is arranged to combine said corresponding values of said adjusted gradient data and said input height value to generate said image data according to the relationship $$\text{Image\_Data}(x,y) = S*\text{Height}(x,y) + T*\text{Gradient}(x,y)$$

where Image_Data (x,y), Height (x,y) and Gradient (x,y) are the values of said image data, said input height and said adjusted gradient data at a point (x,y) on the surface respectively and S and T are weighting coefficients.

14. An apparatus according to claim 13, wherein said processing means is arranged such that S+T=1.

15. An apparatus according to claim 13, wherein said image forming means is adapted to form the image such that the color of a point of the surface is determined by the corresponding value of said image data.

16. A method of operation of a metrological apparatus for determining the surface texture or roughness of a workpiece, said metrological apparatus having selection means for selecting one of a plurality of angles of illumination and the method comprising the steps of:
    measuring the height of the surface at a plurality of different points on the surface to produce a plurality of height values;
    calculating local gradient data at each of a plurality of said different points on the surface based on said height values;
    receiving via the selection means a selected angle of illumination;
    adjusting said gradient data dependent upon a selected angle of illumination;
    generating image data by combining the corresponding values of said adjusted gradient data and said input height value for a plurality of said different points; and
    forming an image in accordance with said input image data.

17. A method of operation of an image processing apparatus for providing image data for forming an image on an image carrier, said image being representative of features such as texture and roughness of a surface, the image processing apparatus having selection means for selecting one of a plurality of angles of illumination and the method comprising the steps of:
    inputting a plurality of height values representative of the height at respective different points on the surface;
    receiving via the selection means a selected angle of illumination;
    calculating local gradient data at each of a plurality of said different points on the surface from said input height values;
    adjusting said gradient data dependent upon the selected angle of illumination;
    generating image data by combining the corresponding values of said adjusted gradient data and said input height value for a plurality of said different points; and
    outputting said image data.

18. A method according to claim 17 further comprising the step of forming an image in accordance with the output image data.

19. An method according to claims 18 or 16 wherein said image forming step comprises printing the image on an image carrier.

20. A method according to claims 17 or 16 further comprising the step of inputting the selected angle of illumination.

21. A method according to claims 17 or 16, further including the step of normalising the height data.

22. A method according to claim 21, wherein said height data is normalised in relation to the range of the height data.

23. A method according to claims 17 or 16, further including the step of normalising the gradient data.

24. A method according to claim 23 wherein said gradient data is normalised in accordance with the standard deviation of the gradient data.

25. A method according to claims 18 or 16 wherein said image forming step forms an image of the point (x,y) in a colour in accordance with a weighted mean of the height value at the point (x,y) and the adjusted gradient value at the point (x,y).

26. A method according to claims 18 or 16 wherein said image forming step forms the image on a visual display unit.

27. A method according to either claim 17 or 16, wherein in said combining step said corresponding values of said adjusted gradient data and said input height value are combined to generate said image data according to the relationship $$\text{Image\_Data}(x,y) = S*\text{Height}(x,y) + T*\text{Gradient}(x,y)$$

where Image_Data (x,y), Height (x,y) and Gradient (x,y) are the values of said image data, said input height and said adjusted gradient data at a point (x,y) on the surface respectively and S and T are weighting coefficients.

28. A method according to claim 27, wherein said weighting coefficients are arranged such that S+T=1.

29. A method according to either claim 17 or 16, wherein in said image forming step, the color of a point of the surface is determined by the corresponding value of said image data.

30. A computer useable medium having computer readable instructions stored therein for causing the computer to process a plurality of height values, each height value being representative of the height at a respective different point on an image carrier, said image being representative of characteristic of the surface,
    said instructions comprising instructions for causing the computer to:
    (i) calculate local gradient data at each of a plurality of said different points on the surface from said height values;
    (ii) adjust said gradient data dependent upon a selected angle of illumination; and
    (iii) generating image data by combining the corresponding values of said adjusted gradient data and said input height value for a plurality of said different points.

31. Image processing apparatus for providing image data for forming an image on an image carrier, said image being representative of a characteristic surface, the apparatus comprising:
    input means for inputting a plurality of height values, each height value being representative of the height at a respective different point on the surface;
    processing means for:
    (i) calculating local gradient data at each of a plurality of said different points on the surface from said input height values,
    (ii) adjusting said gradient data dependent upon a selected angle of illumination, and
    (iii) generating image data using said adjusted gradient data for a plurality of said different points; and
    output means for outputting said image data.

32. An image processing method for providing image data for forming an image on an image carrier, said image being representative of a characteristic of a surface, the method comprising the steps of:

inputting a plurality of height values representative of the height at respective different points on the surface;

calculating local gradient data at each of a plurality of said different points on the surface from said input height values;

adjusting said gradient data dependent upon a selected angle of illumination;

generating image data using said adjusted gradient data for a plurality of said different points; and outputting said image data.

33. An image processing apparatus for providing image data for forming an image on a image carrier, said image being representative of a characteristic of a surface, the apparatus comprising:

input means for inputting a plurality of height values associated with an array of points on the surface, the array having an x direction and a y direction and each height value being representative of the height at a respective particular point;

processing means for:

(i) calculating for each particular point the difference between the respective height values of the points immediately preceding and following that particular point in the x direction to generate gradient data in the x direction, (ii) calculating for each particular point the difference between the respective height values of the points immediately preceding and following that particular point in the y direction to generate gradient data in the y direction, (iii) determining from the gradient data in the x direction and the gradient data in the y direction gradient data for a set direction of illumination, and (iv) generating image data using the gradient data determined for the set direction of illumination; and output means for outputting said image data.

* * * * *

UNITED STATES PATENT AND TRADEMARK OFFICE
CERTIFICATE OF CORRECTION

PATENT NO.   : 6,345,107 B1                                    Page 1 of 1
DATED        : February 5, 2002
INVENTOR(S)  : Paul James Scott It is certified that error appears in the above-identified patent and that said Letters Patent is hereby corrected as shown below:

<u>Column 1,</u>
Line 14, insert -- BACKGROUND OF THE INVENTION --.

<u>Column 4,</u>
Line 56, "use" should read -- used --.
Line 63, "them" should read -- the --.

<u>Column 5,</u>
Line 4, "setto" should read -- set to --.

<u>Column 8,</u>
Line 47, "2" should read -- 3 --.
Line 49, "2" should read -- 3 --.
Line 62, "3" should read -- 2 --.

Signed and Sealed this

Thirteenth Day of August, 2002

*Attest:*

*Attesting Officer*

JAMES E. ROGAN
*Director of the United States Patent and Trademark Office*